United States Patent [19]

Takenoya et al.

[11] 4,455,953
[45] Jun. 26, 1984

[54] STITCH CONTROL METHOD FOR AN ELECTRONIC SEWING MACHINE

[75] Inventors: Hideaki Takenoya; Mikio Inamori; Eiichi Shomura, all of Tokyo, Japan

[73] Assignee: Janome Sewing Machine Co., Ltd., Tokyo, Japan

[21] Appl. No.: 323,912

[22] Filed: Nov. 23, 1981

[30] Foreign Application Priority Data

Nov. 21, 1980 [JP] Japan ............................. 55-163379

[51] Int. Cl.³ ...................... D05B 3/02; D05B 27/22
[52] U.S. Cl. ............................ 112/262.1; 112/158 E; 112/315
[58] Field of Search ............... 112/262.1, 158 E, 314, 112/315, 220, 266.1

[56] References Cited

U.S. PATENT DOCUMENTS 4,276,840 7/1981 Takenoya et al. .......... 112/158 E X
4,343,249 8/1982 Takenoya et al. ............ 112/158 E

*Primary Examiner*—Peter P. Nerbun

*Attorney, Agent, or Firm*—Michael J. Striker

[57] ABSTRACT

During stitching a pattern, there is often issued a designation to change the pattern under forming to the other. In such a case total load on a fabric feed control motor and a needle amplitude control motor is temporarily increased. A microcomputer which controls driving of these motors, discriminates the new designation and rotating phase of the sewing machine and drives the fabric feed control motor by means of specific data by mean value of the maximum and the minimum fabric feed control data, instead of the fabric feed control data which is first read out next to said designation. The control amount brought about by difference between said specific data and the fabric feed control data read out prior to said designation which controls as the final fabric feed before said designation, is caused to prevent the maximum available to the sewing machine so that the total load applied to the two motors are reduced when the maximum possible control is given to the needle amplitude control motor in succession to the load on the fabric feed control motor.

1 Claim, 9 Drawing Figures

1. START
2. $\alpha$ = straight stitching
3. A = 0, n = 0
4. Amplitude phase
5. KEY- reading out
6. Pattern selection   7. $\alpha'$ memory
8. During rotation   9. $\alpha = \alpha'$, n = 0   10. A = 1
11. n = 0   12. Reading out of data of $\alpha + n$
13. Data is RET signal   14. Calculation of control amount
15. Amplitude output   16. A = 1   17. Feed = 15
18. Calculation of control amount
19. Feed phase   20. Feed output
21. A = 1   22. n = n+1   23. $\alpha = \alpha'$, n = 0, A = 0,

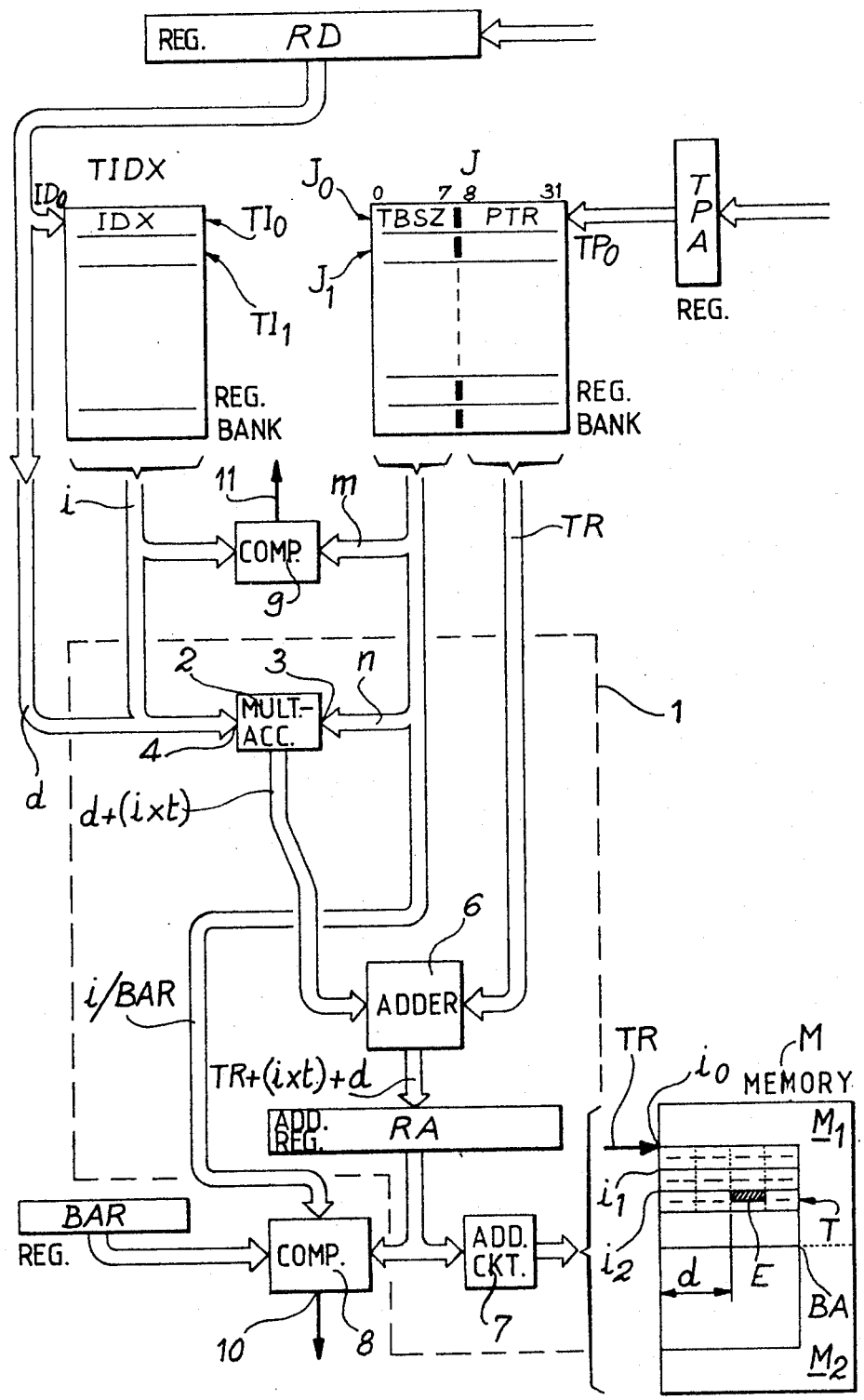

STITCH CONTROL METHOD FOR AN ELECTRONIC SEWING MACHINE

BRIEF DESCRIPTION OF THE INVENTION

Motors are installed in an electronic sewing machine for controlling fabric feed and needle amplitude, and those have been set for so called ordinary stitching where selected simple patterns are repeatedly formed. There is often issued a designation to change the simple pattern for another one. The present invention is to prevent, in such a case, temporary increase of total load on both motors. A microcomputer which controls driving of these motors discriminates the new designation and rotating phase of the sewing machine and drives the fabric feed control motor by means of specific data made by mean value of the maximum and the minimum fabric feed control data, instead of the fabric feed control data which is first read out next to said designation. Thereby, control amount brought about by difference between said specific data and the fabric feed control data read out prior to said designation which controls as the final fabric feed before said designation, is caused to prevent the fabric feed control motor from doing the maximum feed control operation, which may otherwise be available to the sewing machine. The total load applied to the two motors is thus effectively reduced even when the maximum possible control is given to the needle amplitude control motor in succession to the load on the fabric feed control motor.

The needle amplitude control of the electronic sewing machine is carried out in response to the control amount within an interval (a b) of the rotation phase above height ($H_1$) from a needle plate 3, in locus 2 drawn on an abscissa in FIG. 1 by a needle 1 at its end point shown with rotation angle of an upper shaft of the sewing machine. On the other hand, the fabric feed is made within an interval where a feed dog (not shown) is above the needle plate 3. The fabric feed control is similarly carried out in response to the control amount within an interval (c d) lower than depth ($H_2$) from the needle plate 3, in locus 4 drawn by vertical movement of the feed dog. In view of function and structure of the sewing machine, a control prohibiting section (b c) is provided between a phase (b) where the needle amplitude control should be completed and a phase (c) where succeeding fabric feed control starts. A phase (d) where the fabric feed control should be completed and a phase (a') where the needle amplitude control starts after one rotation of the sewing machine from the phase (a) are close each other, and a section (a' d) exists where both controls can be overlapped. In order to reduce the size and capacity of the control motors, the whole area of these available control intervals in the maximum control amount should be used in case of the maximum and the area may be partially used in case of a smaller control amount.

Although the both motors can be driven for the interval (a' d), simultaneous operation thereof requires a large capacity for the driving source and complicates the control system. Therefore, either one of them is driven in this interval, too, in the actual system.

Reference will be made to control of the motor in forming the patterns as shown in FIG. 2(A)(B). FIGS. 7 and 8 show data for controlling the patterns in FIG. 2(A)(B). In these figures, The right maximum position (R) of the needle corresponds to an amplitude co-ordinate data 0, and the left maximum position (L) corresponds to 30. The maximum forward feed of the fabric corresponds to the fabric data 30 and zero feed corresponds to 15, and the maximum backward feed of the fabric corresponds to 0. The control amounts in FIGS. 7 and 8 are the values obtained by the difference with respect to the previous needle dropping data. The needle dopping positions are shown with black circular marks (●), and the unit pattern in FIGS. 2 and 7, for example, is formed with seven needle droppings from 1 through 7. The figure in parentheses ( ) shows the order of the needle drop in the succeeding sequence. The maximum control value of the fabric feed and the needle amplitude is 30 in FIGS. 7 and 8. This means that each of the motors is required in drive to bring about the maximum control the sewing machine allows during one stitch forward. In the control of the two motors, the maximum value of the total of the control amount of the fabric feed and that of the subsequent needle amplitude is 45 as shown in FIG. 7, and this value is far lower than 60 by the simple arithmetic calculation (this fact depends upon that it exceptionally includes the same successive needle dropping as the needle droppings No. 6 and No. 7). The feed control amount 30 is applied to the whole area of the interval (c d) in order to utilize the intervals (c d)(a' b') to the maximum at each of the maximum movements, and if the subsequent amplitude control starts at the phase (d) the control is well finished prior to the phase (b') since the control amount is enough under 30. When the feed control amount is well under 30, it is controlled within the interval (c a'), and if the following amplitude control amount is 30, it is started at the phase (a') and is finished at the phase (b'). The capacity of each of the motors is determined by output per time required for bringing about the maximum control amount at these intervals (c d) and (a' b). However, if a different pattern is selected during sewing operation, there is such a case that the total of the control amounts reaches 60. That is, if a new pattern is selected at a phase before a phase (a) (or a phase indicated with a') in FIG. 1, new data for the needle amplitude and the fabric feed are read our at the phase (a) (or the phase a'). When a pattern (B) of FIG. 2(B) is selected in the interval (a a') before the phase (a) where the needle drop No. 5 is completed in the course of forming the pattern (A) of FIG. 3, the fabric feed data for controlling the fabric feed control motor in the interval (c d) is 0 to effect the needle drop No. 6 given in FIG. 7, and the fabric feed control amount is −30, and the needle amplitude control data for the needle drop No. 5 is 30. When the needle amplitude control data 0 is read out for the needle drop No. 1 of FIG. 8 at the phase (a'), the control amount to be provided at the interval (a' b') is 0−30=−30, and the total control amount (absolute value) is 60. Thus, the both motors are controlled at the maximum control amount 30. Since the control interval the total amount can take is (c b'), the load applied to the fabric feed control motor is reduced when the switch points of these motors are to the right in an allowable switching section (a' d), however there is brought about an interrelationship that the load applied to the needle amplitude control motor is increased as much as said reduced amount. For convenience to the explanation in this case, it is presumed that the switching point is at center phase (e) of the phase (a')(d), and the both motors are determined in their capacities.

With respect to the capacities of the both motors which have been set such that the respective motors are controlled at the intervals (c d)(a' b') at their maximum control amount, basing upon that the simple patterns are formed by simple repetition, when switching the pattern for selecting a new pattern during driving the sewing machine, the control time is shortened by the intervals (e d)(a' e), so that the both motors lack in the capacities to cause erroneous operation. Therefore the motors should be increased in capacities.

The electronic sewing machine in general controls inclination of a feed controller by means of the fabric feed control motor at the rotation phase from passing of the needle through the needle plate to drawing-out, and controls the needle amplitude by means of the needle amplitude control motor at the phase above the needle plate.

This invention is to reduce the size and capacity of these motors as well as the common power source to drive the motors. By incorporation of adjoining fabric feed control and needle amplitude control, the total load applied to these motors is reduced to the utmost, the output density is lowered, and conditions are moderated in control time to each of the motors so as to realize miniaturization.

BRIEF DESCRIPTION OF THE DRAWINGS

FIG. 1 is a view showing loci of movement of the needle and the feed of the sewing machine, FIG. 2(A)(B), FIG. 3 and FIG. 4 are examples of stitch formations, FIGS. 5 and 6 are flow charts of controllings, FIGS. 7 and 8 show relationship between the fabric feed and the needle amplitude.

DETAILED DESCRIPTION OF THE INVENTION

An embodiment of the invention will be explained with reference to the attached drawings FIG. 3 shows a pattern which is conventionally formed by selection of the pattern in FIG. 2(B) before completion of the needle drop No. 5 during forming the pattern in FIG. 2(A). The figures without dash (') indicate the needle dropping No. of FIG. 2(A), and the figures with dash indicates the needle dropping No. of FIG. 2(B).

FIG. 3 shows, in reference to FIG. 2(A)(B) and FIGS. 7 and 8, that the fabric feed data for forming the needle drop No. 6 is 0, and its control amount is −30 and a subsequent new needle amplitude data to be controlled for the needle drop No. 1 of FIG. 2(B) is 0, whereby No. 1' is generated in place of No. 6 by this 0 and said fabric feed data 0, and the amount of the needle amplitude control from the needle dropping No. 5 to No. 1' is −30. Therefore, the total of the control amount of the fabric feed and the needle amplitude is 60 (absolute value).

FIG. 4 shows that the pattern is switched by control of the invention when the pattern in FIG. 2(B) is selected before completion of the needle dropping No. 5 during forming the pattern in FIG. 2(A). When the pattern is selected as mentioned during operation of the sewing machine, the microcomputer controls the fabric feed data at 15, irrespectively of the data, as an initial needle dropping No. 1' at said switching, in place of the fabric feed data 0 for forming the needle dropping No. 6 in the explanation of FIG. 3. Thereby, if the fabric feed data for controlling the preceeding needle drop is either 0 or 30, the control amount brought about by the difference from the data 15 does not exceed the absolute value 15. Therefore, even if the succeeding needle amplitude control amount is 30 (maximum) the total thereof does not exceed 45.

The control movement will be explained with reference to the flow chart in FIG. 5. The program control is started by the microcomputer supplying the control power source, and a straight stitching is specified with $\alpha$ later mentioned as an initial setting without selecting the pattern. Flag A, which is turned to 1 when a pattern is selected during operating the sewing machine, is initialized to 0, and the address n, which specifies a first stitch number for controlling the straight stitching or the selected pattern, is set to 0 for specifying the first stitch. The rotation phase of the sewing machine reads out and receives a pattern selecting key at the amplitude phase, i.e., the phase (a b)(or a' b, etc) in FIG. 1. During operation of the sewing machine, said receipt is effected at the phase (a)(or a', etc) for starting a new amplitude control. The pattern in FIG. 2(A) is selected during stopping of the sewing machine. The designating signal for the straight stitching or the selected pattern is stored at $\alpha'$ register in order to designate sorts of new patterns. The pattern in FIG. 2 (A) is stored as $\alpha'_1$. This data is stored in the $\alpha$ register. For example, FIG. 5 shows the programming operation of the microcomputer and the alpha register is simply a memory element of the microcomputer for convenience to help the programming operation by the microcomputer. Said data is $\alpha'_1$, but called as $\alpha_1$. Setting is effected as n=0. An initial stitching data, $\alpha+0$, is read out as an address $\alpha+n$ in the stitch control data memory of the computer. The above mentioned data are the needle amplitude coordinate data 0 of the needle dropping No. 1 and the fabric feed data 30 of the needle dropping No. 2 in FIG. 7. Since these data are not return (RET) signal which is read out in succession from the last stitching of the pattern, calculation of each control amount is made. Although detailed information is not given in the flow chart, the control amounts shown in FIGS. 7 and 8 are determined by calculation of the difference between the said read data and the data read immediately before. With respect to the first stitching after selecting the pattern, the difference between the needle amplitude and the fabric feed as well as the corresponding previous needle amplitude and fabric feed are compared. The needle amplitude control motor positions on the needle amplitude coordinate 0 for the needle dropping No. 1 at the needle amplitude phase (a b). The control amount is then insufficient. Being A =0 then the fabric feed control motor is regulated at 30 of the fabric feed amount for the needle dropping No. 2 at the feed phase (c d) after the sewing machine slightly driven. The control amount is also insufficient. The calculation of n=n +1 is made for advancing by 1 the address of the memory of the stitch control data, and the data of the address $\alpha+1$ is read out at the phase (a'). The needle amplitude is 30, and the fabric feed is 0 in said data. The calculation of the control amount results in +30 of the needle amplitude, and −30 of the fabric feed. Since the control amount of the needle amplitude subsequent to said insufficient control amount for the needle dropping No. 2, is +30 (maximum), there is a case that the total reaches 60. However, this case occurs in an initial period of drive of the sewing machine after selecting the pattern, and since the sewing machine is in general driven at very low speed during this period even if it is started at the maximum speed, there is no problem in responsibility to the control motor. If necessary, it is possible to easily provide control not to switch to the high speed operation until the pattern change is completed after a new pattern is selected during stopping of the sewing machine. When the first stitch is formed after pattern selection, the total of the control amount does not exceed 45 with respect to the independent patterns as seen in FIG. 7. Then, each of the phase signals in FIG. 1 is re-read for repeated use, and the stitching of the pattern in FIG. 2(A) is advanced and the needle dropping No. 4 is completed at the phase (a). When the pattern in FIG. 2(B) is selected before said phase, KEY of the pattern selection is read out at the phase of starting a new amplitude control. The selected new pattern ($\alpha'$) is stored. It is called as $\alpha'_2$. Setting is made as A = 1, as the sewing machine is on driving. As n is 4, the data of the previous pattern address $\alpha_1+4$ is read out. Those are the needle amplitude data 30 for the needle dropping No. 5 and the fabric feed data 0 for the fabric feed No. 6 in FIG. 7. As a result of the calculation on the control amount, the needle dropping No. 5 is formed by the old data. Being A=1, the fabric feed data 0 for the needle dropping No. 6 is replaced with 15. Since the fabric feed data for the needle dropping No. 5 is 30, $-15$ is obtained by the following calculation of the control amount. The fabric feed control motor is driven by $-15$ at the phase (c a'). Actually, the control is completed sufficiently before the phase (a') in case of $-15$. Being A=1, $\alpha'_2$ is stored in the $\alpha$ register. It is called as $\alpha_2$. Setting is effected as n=0 and A=0. Although detailed information is not given in the flow chart, a new pattern, i.e., a stitch control data of the first address $\alpha_2+0$ in FIG. 2(B) is read at the phase (a'), providing that the control is completed before the phase (a'). This needle amplitude data is the data 0 of the needle dropping No. 1 in FIG. 8. As the needle amplitude data of the previous needle dropping No. 5 is 30, the control amount is $-30$. The needle amplitude control motor is driven with the maximum amount at the phase (a' b') and the needle dropping No. 1' is formed. Thus, the total control amount of the both control motors is 45 at the phase (c b'). When the needle dropping No. 2' is formed as the address progresses, the data to be read next is a return signal for repeatedly forming the needle dropping No. 1', setting n=0, and the control returns to the initial address to repeatedly form the new pattern.

The controlling example including a backstitching be explained in reference to the flow chart in FIG. 6. The contents in the memory of the stitch control data is omitted, but the return signals (RET) are given before the first stitch control signal and after the last stitch control signal. When the program is started in FIG. 6, the initial routine represented with dotted line is executed, and straight stitch or like in FIG. 5 is set. Flag B, which is 1 when the backstitching is designated, is returned to 0. The address m, which has been represented with n in FIG. 5, is turned to 1. This designates the initial stitch, and the address 0 is in response to the return signal. The key for the pattern selection and the backstitching is read out and received at the amplitude phase (a b). A routine for the pattern selection is omitted. If KEY specifies a new backstitching, the flag N is turned to 1, and if not specifying, the flag is kept 0. If the backstitching is not previously designated, it is B=0, and the stitch control (represented by (m)) signal of each address m is made a needle amplitude control signal. If the backstitching is newly designated during the stitching operation, the control signal 15 is given, irrespectively of the fabric feed control signal of the address m, and each of the control motors is driven in response to these data. The calculations of the control amounts in FIG. 5 are omitted respectively. The program is repeated, and being B=1, the calculation of m=m−1 is made to continue the backstitching. When the return signal (RET) corresponding to the address 0 is given, the address progresses until the return signal (RET) succeeding to the last stitch, and the backstitching is executed by moving back the addresses from the last stitch corresponding to the address before the return signal.

As mentioned above, if the designation is made to change the simple pattern under stitching to the other pattern, the control amount of the fabric feed at switching time is limited commonly to the both motors such that the total amount of the fabric feed control and the needle amplitude control does not exceed the determined amount, thereby to enable to reduce the both motors in size and capacity.

We claim:

1. In a stitch control method in operation of a sewing machine of the type having stitch forming instrumentalities, a microcomputer having an electronic memory storing stitch control signals including data for controlling a needle position and a fabric feed of the sewing machine to produce a series of stitches of a selected pattern, a needle position control motor and a fabric feed control motor which respectively control the needle position and the fabric feeding movement, said microcomputer controlling the needle position and the fabric feed control motors such that said microcomputer reads out the stitch control signals from the electronic memory at predetermined rotation phases of the sewing machine to programmingly control the stitches of a selected stitch pattern and a repeated formation of the pattern, said microcomputer seeking a feed control amount from a predetermined intermediate data of a value between the maximum feed control data and the minimum feed control data upon identification of the total value of the feed control amount and the needle control amount to be over a predetermined value, to thereby control the stitches of the selected pattern.

* * * * *